March 14, 1961     A. I. MINTZER     2,975,299
TIME DISCRIMINATOR
Filed Jan. 2, 1957
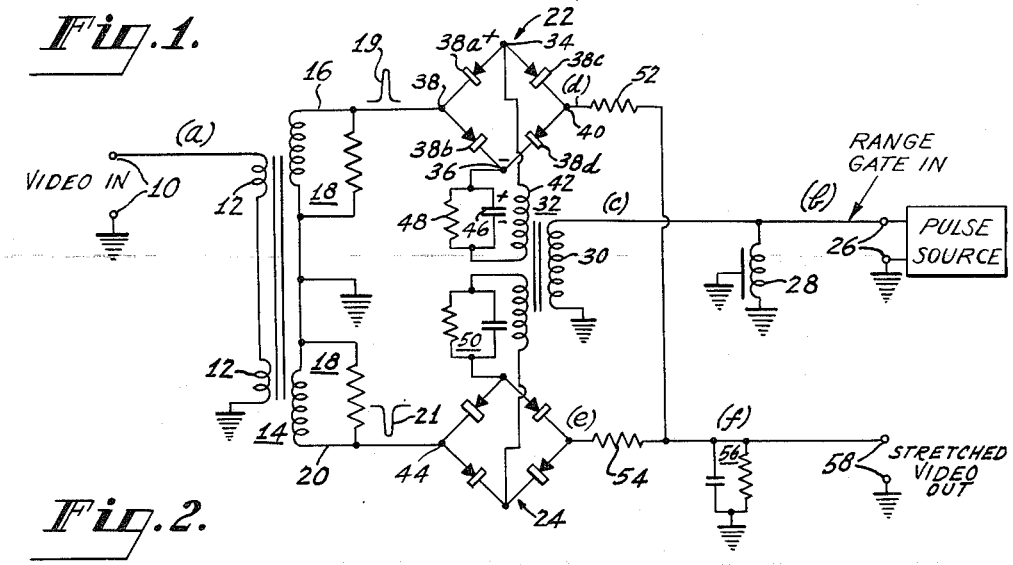
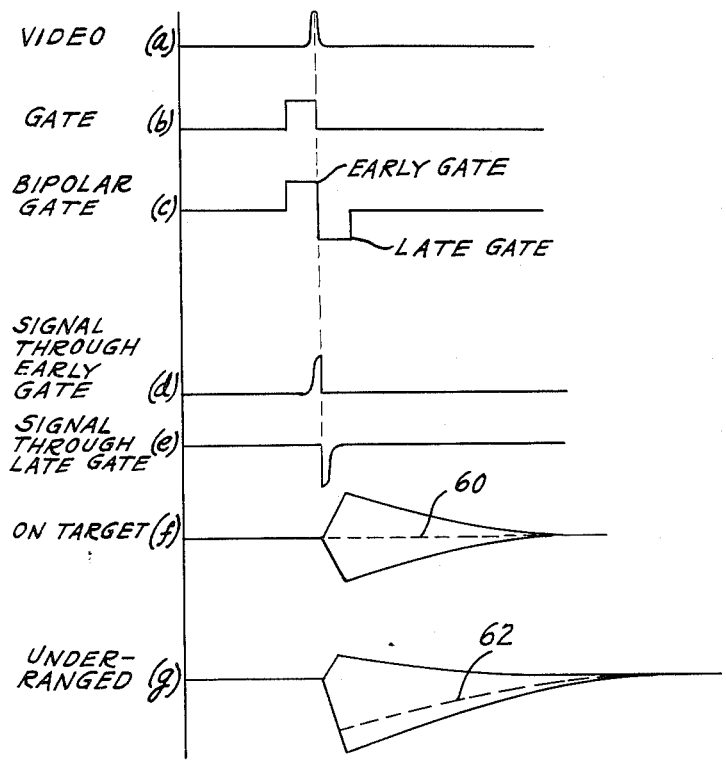
INVENTOR.
ALFRED I. MINTZER
BY
ATTORNEY United States Patent Office 2,975,299
Patented Mar. 14, 1961

2,975,299
TIME DISCRIMINATOR

Alfred I. Mintzer, Collingswood, N.J., assignor to Radio Corporation of America, a corporation of Delaware Filed Jan. 2, 1957, Ser. No. 632,041

2 Claims. (Cl. 307—88.5)

The present invention relates to an improved circuit for sensing the time of occurrence of a pulse signal. The invention is particularly useful in automatic tracking radar systems.

An automatic range tracking radar system is one which, after locking on a target, continues to supply information as to the position of the target. The automatic range tracking circuits of the radar system compare the time of occurrence of a target echo with the time of occurrence of one or more gate pulses generated in the radar system. Any change in time relationship is sensed and converted to an error voltage. The error voltage maintains constant the time relationship between the gate pulse or pulses and the echo pulse by controlling the time of occurrence of the gate pulse or pulses.

The sensing described above is performed by a time (or phase) discriminator circuit. Several types of such circuits are commonly in use. They include the split gate circuit, the split video circuit and the bipolar video circuit. In the split gate circuit, early and late gate pulses of the same polarity are generated. These are separately amplified and they individually control switches through which the video pulses derived from the target echo pulses pass. The video pulses which pass through the switches are combined and used to produce a direct error or control voltage. There is zero error (zero control voltage) when the switches pass equal currents, that is, when the center of the video pulse occurs at the crossover point of the early and late gates. A basic disadvantage of the split gate time discriminator system is the need for dual channel amplification. Any change in the gain of a channel causes an error in the control signal. Another disadvantage is that the leading edge of the late gate must correspond in shape to the lagging edge of the early gate to obtain accurate and repeatable error voltage information.

The split video time discriminator circuit is one in which the video signal is split into early and late video pulses of the same polarity and these are separately amplified and applied to switches. A gate pulse is simultaneously applied to both switches and simultaneously opens the switches. In other respects the circuit is similar to the split gate circuit and has the same inherent disadvantages. Moreover, in those cases in which a delay line is used to produce the late video pulse, the quality of the video pulse may be seriously adversely affected by improper delay line termination. This last disadvantage is especially pronounced at low signal-to-noise ratios.

The bipolar video time discriminator circuit provides the means for sensing by processing the video signal in a delay line coder. A positive-going video pulse, for example, is passed through a delay line terminated in a short circuit which converts the video pulse to a bipolar video pulse. The bipolar video pulse is used as a switching signal. This circuit has serious practical disadvantages. One is that the reflected pulse (late gate) is attenuated by the delay line and therefore is of lower amplitude than the unreflected pulse (early gate). Another disadvantage is that unless the sending end of the line terminates the line exactly in its characteristic impedance, extra reflections result. These seriously deteriorate the sensing performance of the system and may even produce unstable nulls. A final disadvantage of the bipolar video circuit is that prior processing of the video signal for lead or back edge tracking would deteriorate the overall circuit performance in regard to noise rejection, balance, and sensitivity. This results from the cascading of residual effects, which are present in the bipolar video system.

An object of this invention is to provide a time discriminator circuit which is relatively simple and trouble-free and which overcomes the inherent disadvantages of the above described systems.

Another object of the invention is to provide an improved discriminator circuit in which dual amplification channels are not required.

Yet another object of the invention is to provide a time discriminator in which the reference point (the so-called cross-over point) is independent of the matching of the decay time of the lagging edge of a first pulse (the early pulse) and the rise time of the leading edge of a second pulse (the late pulse).

A typical embodiment of the present invention includes a pair of normally closed switches, one capable of conducting current in one direction and the other capable of conducting current in the opposite direction. The switches are opened in immediate succession. A signal (video) pulse is simultaneously applied in one polarity to one of the switches and in the opposite polarity to the other switch, the polarities being such that the switches, when open, can conduct the pulses. A common circuit is connected to receive the outputs of the switches and derives from the outputs an integrated signal having a sense and amplitude indicative of the time of occurrence of the signal pulse relative to a reference pulse.

In a preferred form of the invention, the switches comprise diodes and the means for opening the switches, an early gate pulse of one polarity applied to one of the switches and a late gate pulse of opposite polarity applied to other of the switches. The gate pulses may be generated by applying a unidirectional gate pulse to a short-circuited delay line having a length equal to one-half the gate duration.

The invention will be described in greater detail by reference to the following description taken in connection with the accompanying drawing in which:

Figure 1 is a schematic circuit diagram of a preferred form of the present invention; and Figure 2 is a drawing of waveforms present at various points in the circuit of Figure 1.

Referring to Figure 1, a video signal $a$ is applied from a low impedance source such as a cathode follower (not shown) to input terminals 10. The terminals are connected to the primary winding 12 of a phase inverting transformer 14. Thus, at one end 16 of the secondary winding 18 a video signal 19 of positive polarity is developed, whereas at the other end 20 of the secondary winding 18 a video signal 21 of the opposite polarity is developed. These signals are applied to normally closed diode switch circuits 22 and 24, respectively.

Referring now to the right portion of Figure 1, a range gate pulse $b$ developed in other portions of the radar system (not shown) is applied to input terminals 26. Pulses $a$ and $b$ and others which will be referred to in the following discussion are shown in Figure 2. Terminal 26 is connected to a short-circuited delay line 28 which has a length equivalent to one-half the duration of pulse $b$. Thus, the portion of the pulse which passes down the delay line and is reflected back from its short-circuited end will have its leading edge coincident with the lagging edge of pulse $b$. As is understood by those skilled in this art, the pulse reflected from the short-circuited end of the delay line 28 is reversed in polarity. The resultant composite pulse c, which is applied to the primary winding 30 of pulse transformer 32, includes a first positive-going portion, hereinafter termed an early gate, and a second negative-going portion, hereinafter termed a late gate.

The early gate applied through transformer 32 is of the correct polarity to open switch circuit 22 and the late gate is of the correct polarity to open switch circuit 24. The early gate develops a voltage which is positive at terminal 34 of the bridge and negative at terminal 36 of the bridge. Thus, the diodes 38a, 38b conduct current and are capable of passing a signal applied to terminal 38 of the bridge, to terminal 40 of the bridge. (It should be mentioned that in the drawing the triangle portion of the diode represents its anode and the rectangle its cathode.) For example, if a positive pulse is applied to terminal 38, it passes through diode 38b, secondary winding 42, diode 38c to output terminal 40.

Diode circuit 24 operates in exactly the same manner as circuit 22 except that circuit 24 is energized by the negative-going, late gate and the signal applied to its input terminal 44 is negative-going rather than positive-going.

During the early gate interval, the current passing through secondary winding 42 charges condenser 46 in the polarity indicated. Upon the termination of the early gate, condenser 46 discharges through resistor 48 and the voltage developed across this resistor is now of the correct polarity to bias diodes 38a—38b beyond cut off. Thus, diode circuit 22 is cut off during the periods between early gate pulses. If the diode circuit is thought of as a switch, it is open during the periods between early gate pulses. In the same manner, during the periods between the late gate pulses, bias circuit 50 maintains the switch represented by diode circuit 24 open.

The signal d which passes through switch 22 is positive-going and the signal e which passes through switch 24 is negative-going. These signals are applied through isolating resistors 52 and 54 to integrating circuit 56. When the input video signal is centered at the crossover point of the bipolar gate c, the integrated signal developed at output terminals 58 is as shown at f. Signal d produces an integrated positive-going signal and signal e an integrated negative-going signal. The two are combined by the integrating circuit to produce zero volts, as indicated by dashed line 60 shown in Figure 2f. However, if more signal passes through switch 24 than switch 22, the resultant integrated signal is as indicated by dashed line 62 in Figure 2g. This signal is negative-going and may be further integrated to provide a D.C. control signal. The latter may be fed back through a servo loop (not shown) to the gate generator circuit (not shown).

An important advantage of the circuit described above is that any undesired signals which are fed through switches 22 and 24 are of opposite polarity and therefore cancel at integrating circuit 56. In other words, the keying gates oppose one another. Another is that the method of producing the bipolar gate pulse inherently matches the lagging edge of the early gate with the leading edge of the late gate. This is not the case in systems employing split gates. Another advantage of the system is that dual amplification channels are not required, either for the gate or video pulses.

An important advantage of the present system over the bipolar video system is that the gate pulses are of a wider band nature than the video pulses and thus the gate pulses possess shorter rise and fall times than the video pulses. Also, the gate pulse is not subject to the fluctuations in the amplitude and pulse shape suffered by the video pulse and is much more uniform in character. This means that the crossover point of the present system is determined with more certainty than is the case with the bipolar video system. A final advantage is that termination mismatches at delay line 28 have very little effect on the shaped bipolar gate pulses. This is due to the fact that the pulses are high level, noise-free signals.

What is claimed is:

1. A circuit for sensing the time of occurrence of a pulse signal comprising, in combination, a pair of normally closed bidirectional diode bridge switches, one capable of conducting current in one direction in response to a gate signal of one polarity and the other capable of conducting current in the opposite direction in response to a gate signal of opposite polarity; gate circuit means including a short circuited delay line and means applying a pulse to the line having a duration equal to the time required for the pulse to travel down the line and return for applying a gate pulse of one polarity to said one switch and of the opposite polarity to said other switch, in succession, the lagging edge of the first applied pulse coinciding with the leading edge of the second applied pulse; means for simultaneously applying a signal pulse in one polarity to one switch and in the opposite polarity to the other switch, said polarities being such that the switches, when open, can conduct the pulses; and a common integrating circuit connected to receive the outputs of both switches for producing a control voltage.

2. In combination, a pair of normally closed diode switch means, one capable of conducting current in one direction in response to a gate signal of one polarity and the other capable of conducting current in the opposite direction in response to a gate signal of opposite polarity; a circuit for producing a bipolar gate signal consisting of an early gate portion of one polarity and a late gate portion of the opposite polarity, the lagging edge of the early gate portion coinciding with the leading edge of the late gate portion; means coupled to said circuit for applying said bipolar gate signal to said diode switch means so as to open said switch means in succession; means for simultaneously applying a signal pulse in one polarity to one switch means and in the opposite polarity to the other switch means, said polarities being such that the switch means, when open, can conduct the pulses; and a common integrating circuit connected to receive the outputs of both switch means for producing a control signal, said circuit for producing a bipolar gate signal comprising a source of unidirectional gate pulses, and a short-circuited delay line having a delay equal to one-half the gate pulse duration connected to said source for receiving said unidirectional pulses.

References Cited in the file of this patent

UNITED STATES PATENTS

| | | |
|---|---|---|
| 2,543,431 | Bess | Feb. 27, 1951 |
| 2,781,445 | Stocker | Feb. 12, 1957 |
| 2,782,307 | Von Sivers et al. | Feb. 19, 1957 |
| 2,794,979 | Palmer | June 4, 1957 |
| 2,812,435 | Lyon | Nov. 5, 1957 |
| 2,837,644 | Shallon | June 3, 1958 |
| 2,866,103 | Blake et al. | Dec. 23, 1958 |

FOREIGN PATENTS

| | | |
|---|---|---|
| 650,472 | Great Britian | Feb. 28, 1951 |